(12) United States Patent
Vo et al.

(10) Patent No.: US 10,427,640 B2
(45) Date of Patent: Oct. 1, 2019

(54) LOAD-LIMITING SEATBELT ASSEMBLY

(71) Applicant: Ford Global Technologies, LLC, Dearborn, MI (US)

(72) Inventors: Jeffrey Tien Vo, Southfield, MI (US); Brian Robert Spahn, Plymouth, MI (US); Benjamin Yilma, Canton, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 93 days.

(21) Appl. No.: 15/713,889

(22) Filed: Sep. 25, 2017

(65) Prior Publication Data
US 2019/0092275 A1  Mar. 28, 2019

(51) Int. Cl.
| | |
|---|---|
| *B60R 22/24* | (2006.01) |
| *B60R 22/12* | (2006.01) |
| *B60R 22/36* | (2006.01) |
| *B60R 22/28* | (2006.01) |
| B60R 22/48 | (2006.01) |
| B60R 22/38 | (2006.01) |
| B60R 22/18 | (2006.01) |

(52) U.S. Cl.
CPC .............. *B60R 22/36* (2013.01); *B60R 22/12* (2013.01); *B60R 22/24* (2013.01); *B60R 22/28* (2013.01); *B60R 2022/1818* (2013.01); *B60R 2022/284* (2013.01); *B60R 2022/285* (2013.01); *B60R 2022/385* (2013.01); *B60R 2022/4825* (2013.01)

(58) Field of Classification Search
CPC ......... B60R 22/36; B60R 22/24; B60R 22/12; B60R 2022/385; B60R 2022/4825; B60R 2022/021; B60R 2022/1818; B60R 2022/1825; B60R 2022/1831; B60R 2022/1837; B60R 2022/1843; B60N 2/688
USPC ...... 280/801.1, 807, 808, 805; 297/483, 470
See application file for complete search history.

(56) References Cited

U.S. PATENT DOCUMENTS

| | | |
|---|---|---|
| 6,705,559 B1 | 3/2004 | Sullivan et al. |
| 6,863,236 B2 | 3/2005 | Kempf et al. |
| 6,916,045 B2 | 7/2005 | Clancy, III et al. |
| 7,686,339 B2 | 3/2010 | Rogers |
| 2014/0008478 A1 | 1/2014 | Bergman |
| 2015/0251626 A1* | 9/2015 | Board ..................... B60R 21/18 |
| | | 280/801.1 |

FOREIGN PATENT DOCUMENTS

| | | | |
|---|---|---|---|
| DE | 102006006795 A1 | 8/2007 | |
| DE | 102008042020 A1 | 3/2010 | |
| DE | 102011112989 A1 * | 3/2012 | ............. B60R 22/24 |
| WO | 2016089228 A1 | 6/2016 | |

* cited by examiner

*Primary Examiner* — Keith J Frisby
(74) *Attorney, Agent, or Firm* — Frank A. MacKenzie; Bejin Bieneman PLC

(57) ABSTRACT

A seatbelt assembly includes a seatbelt retractor, a support spaced from the seatbelt retractor, and a webbing retractably engaged with the seatbelt retractor. The webbing is moveable relative to the support. The seatbelt assembly includes a magnet and a conductive material adjacent the magnet. One of the magnet and the conductive material is fixed to the support, and the other of the magnet and the conductive material is moveable by the webbing relative to the support.

19 Claims, 7 Drawing Sheets

LOAD-LIMITING SEATBELT ASSEMBLY

BACKGROUND

A seatbelt in a vehicle may be equipped with "load-limiting" features. During a vehicle impact, a retractor of the seatbelt may lock webbing of the seatbelt from further extension from the retractor, and load-limiting features may permit some additional limited extension of the webbing when the force exerted on the webbing exceeds a load-limiting threshold. This additional extension of the webbing from the retractor limits the load applied by the webbing to the chest of an occupant, which may reduce chest compression.

The function of the load-limiting features are dependent upon the size of the occupant, e.g., the weight and/or height of the occupant. In other words, at a given speed of the vehicle impact, a large occupant may exert a load on the webbing exceeding the load-limiting threshold whereas, at that same speed, the load exerted on the webbing by a small occupant may not exceed the load-limiting threshold.

DETAILED DESCRIPTION

Figure 1:
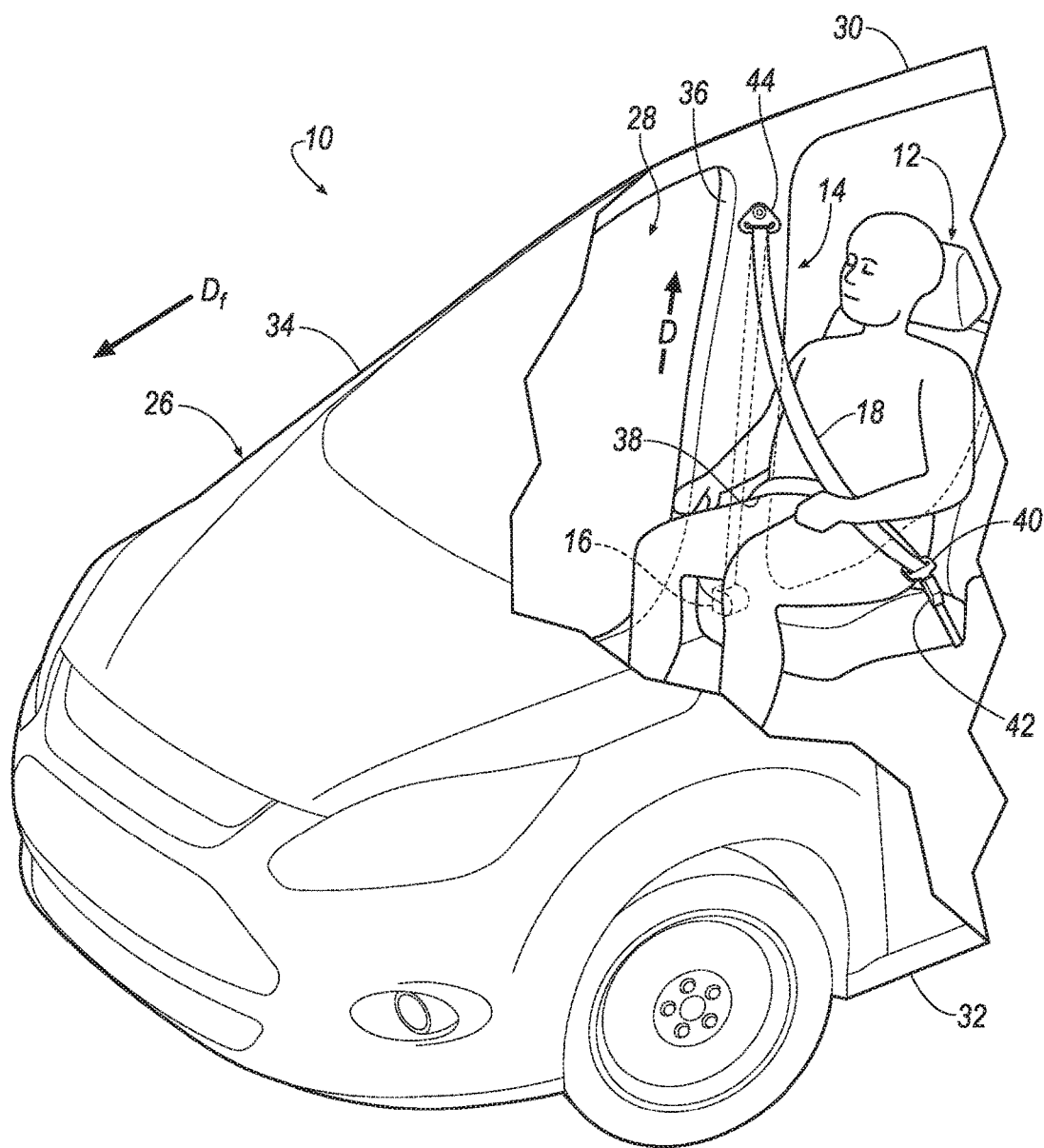
FIG. 1 is a perspective view of a vehicle seat with a seatbelt assembly in a vehicle.

A seatbelt assembly includes a seatbelt retractor and a support spaced from the seatbelt retractor. The seatbelt assembly includes a webbing retractably engaged with the seatbelt retractor and moveable relative to the support. The seatbelt assembly includes a magnet and a conductive material adjacent the magnet. One of the magnet and the conductive material is fixed to the support, and the other of the magnet and the conductive material is moveable by the webbing relative to the support.

The support may include a slot. The webbing may extend through the slot. One of the magnet and the conductive material may be fixed to the webbing, and the other of the magnet and the conductive material may be fixed to the support in the slot. One of the magnet and the conductive material may be embedded in the webbing. The webbing may be elongated along a webbing axis, and the one of the magnet and the conductive material may be at least one strand elongated along the webbing axis. The other of the magnet and the conductive material may be a plate.

The support may include a first end. The support may be pivotable about the first end. The support may include a second end spaced from the first end. The seatbelt assembly may include a tension pulley. The tension pulley may be rotationally supported by the second end of the support. One of the magnet and the conductive material may be fixed to the second end of the support, and the other of the magnet and the conductive material may be fixed to the tension pulley. The tension pulley may be engageable with the webbing. The tension pulley may be rotatable by the webbing. The webbing and the tension pulley each may include a nonslip interface. The nonslip interface of the webbing may be engageable with the nonslip interface of the tension pulley.

The seatbelt assembly may include a spring connected to the tension pulley. The spring may bias the tension pulley towards the webbing.

The seatbelt assembly may include an anchor pulley spaced from the tension pulley and engaged with the webbing. The tension pulley may be moveable by the support relative to the anchor pulley.

The seatbelt assembly may include a pulley. The support may include sides spaced from each other, and the pulley may extend from one side towards the other side. One of the magnet and the conductive material may be fixed to one of the sides, and the other of the magnet and the conductive material may be fixed to the pulley. The pulley may be rotationally supported by both sides of the support. The webbing may be engaged with the pulley. The pulley may be rotatable by the webbing. The webbing and the pulley each may include a nonslip interface. The nonslip interface of the webbing may be engaged with the nonslip interface of the pulley.

The magnet may be a permanent magnet.

The magnet may be an electro-magnet.

With reference to the Figures, wherein like numerals indicate like parts throughout the several views, a vehicle 10 is generally shown. The vehicle 10 includes a seat 12 and a seatbelt assembly 14 having a seatbelt retractor 16 and a webbing 18 retractably engaged with the seatbelt retractor 16. During a vehicle impact, the momentum of an occupant biases the occupant relative to the seat 12. For example, in a front impact or an oblique impact, the momentum of the occupant may bias the occupant away from the seat 12. When the occupant moves away from the seat 12, the occupant may exert a force F on the webbing 18 as the webbing 18 retains the occupant on the seat 12. In this situation, the seatbelt assembly 14 may exert a drag force Fd counteracting the force F exerted by the occupant to limit the load on the occupant when the webbing 18 retains the occupant on the seat 12. Specifically, the seatbelt assembly 14 may apply the drag force Fd to control the payout of the webbing 18 during high loads, which may reduce the momentum of the occupant while also limiting chest compression of the occupant during the vehicle impact. In this situation, the seatbelt assembly 14 may absorb energy to decrease the load exerted on the chest of the occupant by the webbing 18 during the vehicle impact.

With reference to FIGS. 2A-4B, the seatbelt assembly 14 includes a support 20 spaced from the seatbelt retractor 16. The webbing 18 is moveable relative to the support 20. The seatbelt assembly 14 includes a magnet 22 and a conductive material 24 adjacent the magnet 22. One of the magnet 22 and the conductive material 24 is fixed to the support 20, and the other of the magnet 22 and the conductive material 24 is moveable by the webbing 18 relative to the support 20.

During the vehicle impact, the force F exerted by the occupant causes the webbing 18 to payout from the seatbelt retractor 16. In this situation, as the webbing 18 pays out from the seatbelt retractor 16, the webbing 18 moves relative to the support 20. Additionally, the webbing 18 moves one of the magnet 22 and the conductive material 24 relative to the support 20. As the webbing 18 moves relative to the support 20, the magnet 22 and the conductive material 24 move relative to each other. By allowing one of the magnet 22 and the conductive material 24 to move relative to the other of the magnet 22 and the conductive material 24, the seatbelt assembly 14 exerts the drag force Fd.

With reference to FIG. 1, the vehicle 10 may, for example, be any suitable type of automobile. The vehicle 10 may include a vehicle body 26 defining a passenger cabin 28 to house occupants, if any, of the vehicle 10. The vehicle body 26 may include a roof 30, a floor 32 spaced from the roof 30, and a plurality of pillars 34,36 extending from the roof 30 to the floor 32. For example, the pillars 34, 36 may include an A-pillar 34 and a B-pillar 36 spaced from the A-pillar 34. The pillars 34, 36 may include additional pillars, e.g., a C-pillar (not shown).

With continued reference to FIG. 1, one or more seats 12 may be disposed at a front (not numbered) of the passenger cabin 28, e.g., between the A-pillar 34 and the B-pillar 36. In this situation, the seats 12 may be front seats. The passenger cabin 28 may include one or more rear seats (not shown) disposed behind the front seats. The passenger cabin 28 may also include third-row seats (not shown) at a rear (not numbered) of the passenger cabin 28, in which case the seats 12 may be second-row seats (not numbered) instead of or in addition to being front seats. As shown in FIG. 1, the seat 12 is a bucket seat, but the seat 12 may be other suitable types of seat, e.g., a bench seat.

The seatbelt assembly 14 may include the seatbelt retractor 16 and the webbing 18 retractably payable from the seatbelt retractor 16, as shown in FIG. 1. The seatbelt assembly 14 may include an anchor 38 coupled to the webbing 18, and a clip 40 that engages a buckle 42. The seatbelt assembly 14 may be disposed adjacent the seat 12. For example, the seatbelt assembly 14 is adjacent the front seat, as shown in FIG. 1. The seatbelt assembly 14, when fastened, retains the occupant on the seat 12, e.g., during sudden decelerations of the vehicle 10.

The webbing 18 may extend continuously from the seatbelt retractor 16 to the anchor 38. For example, one end of the webbing 18 feeds into the seatbelt retractor 16, and the other end of the webbing 18 is fixed to the anchor 38. The anchor 38 may, for example, be fixed to the seat 12. Alternatively, the anchor 38 may be fixed to the vehicle body 26, e.g., the B-pillar 36, the floor 32, etc. The anchor 38 may be attached to the seat 12 in any suitable manner, e.g., with fasteners.

The webbing 18 may be formed of fabric, e.g., woven nylon. The clip 40 slides freely along the webbing 18 and, when engaged with the buckle 42, divides the webbing 18 into a lap band and a shoulder band.

The seatbelt retractor 16 may be mounted to the vehicle body 26. For example, the seatbelt retractor 16 may be attached to the B-pillar 36, as shown in FIG. 1. As another example, when the seatbelt assembly 14 is adjacent the rear seat, the seatbelt retractor 16 may be attached to the C-pillar. Alternatively, the seatbelt retractor 16 may be attached to the seat 12. The seatbelt retractor 16 may be attached to the vehicle body 26 in any suitable manner, e.g., fasteners.

The seatbelt retractor 16 may be moveable from an unlocked position to a locked position by conventional mechanisms known in the art. In the unlocked position, the webbing 18 may be extended from and retracted into the seatbelt retractor 16. In the locked position, the seatbelt retractor 16 prevents extension of the webbing 18 to limit the forward movement of the occupant. The seatbelt retractor 16 may be in the unlocked position by default, i.e., in the absence of a sudden deceleration. The seatbelt retractor 16 may change from the unlocked position to the locked position during a sudden deceleration of the vehicle 10, i.e., deceleration triggers components of the seatbelt retractor 16 to change from the unlocked position to the locked position.

The seatbelt retractor 16 may include a torsion bar (not shown). The torsion bar may be of the conventional type known in the art. The torsion bar may rotate freely in the unlocked position. In the locked position, one end of the torsion bar may be fixed to prevent rotation of the torsion bar, i.e., payout of the webbing 18. The torsion bar may be designed to rotationally yield, that is, plastically deform, as the torsion bar is rotated by the webbing 18, i.e., by the force F exerted on the webbing 18 by the occupant. In particular, the torsion bar may be formed of suitable shape, dimension, and material to yield when subjected to a threshold rotational force. For example, when the seatbelt retractor 16 is in the locked position but the webbing 18 exerts a force (not shown) on the seatbelt retractor 16, the torsion bar may prevent the webbing 18 from paying out unless the force by the webbing 18 exceeds a threshold, in which case the rotational yielding may permit the webbing 18 to payout.

With reference to FIG. 1, the seatbelt assembly 14 may include a D-ring 44 engaged with the webbing 18. For example, the webbing 18 may freely slide through the D-ring 44. In other words, the webbing 18 may extend from the anchor 38 through the D-ring 44 to the seatbelt retractor 16. The D-ring 44 may be spaced from the seatbelt retractor 16. For example, the D-ring 44 may be disposed between the seatbelt retractor 16 and the roof 30. As another example, the seatbelt retractor 16 may be adjacent to the floor 32 and the D-ring 44 may be adjacent to the roof 30. The D-ring 44 may be fixed to the vehicle body 26, e.g., the B-pillar 36.

The seatbelt assembly 14 may be a three-point harness, meaning that the webbing 18 is attached at three points around the occupant when fastened: the anchor 38, the seatbelt retractor 16, and the buckle 42. The seatbelt assembly 14 may, alternatively, include another arrangement of attachment points.

The magnet 22 may be any suitable type of magnet. For example, the magnet 22 may be a permanent magnet. In this situation, the magnet 22 may be formed of a magnetic material, e.g., iron, nickel, or cobalt, and the magnet 22 may continuously produce a magnetic field. Alternatively, the magnet 22 may be an electro-magnet, e.g., a resistive magnet, a superconductive magnet, a hybrid magnet, etc. In this situation, the magnet 22 produces a magnetic field when an electric current passes through the magnet 22. For example, the magnet 22 may be in communication with a controller (not shown). The controller may, for example, send the electric current through the magnet 22 during the vehicle impact. In other words, the controller may selectively induce the magnetic field in the magnet 22. In this situation, the magnet 22 produces the magnetic field during the vehicle impact.

The conductive material 24 may be any suitable electrically conductive material. In other words, the conductive material 24 may be formed of any material suitable for carrying an electric current. For example, the conductive material 24 may be formed of any suitable metal, e.g., steel, copper, aluminum, etc.

As set forth further below, several embodiments of the seatbelt assembly 14 are shown in FIGS. 2A-B, 3A-B, and 4A-B, respectively. Each embodiment may include any suitable number of magnets, i.e., one or more. For example, the embodiment shown in FIGS. 4A and 4B includes a plurality of magnets, i.e., more than one. In the embodiment shown in FIGS. 2A and 2B, the support 20 may be fixed to the B-pillar 36 and the webbing 18 may extend through the support 20. In the embodiment shown in FIGS. 3A and 3B, the support 20 may be pivotable in a cross-vehicle direction Dc. In the embodiment shown in FIGS. 4A and 4B, the support 20 may be the D-ring 44. Common numerals are used to identify common features in the embodiments.

Figure 2A:
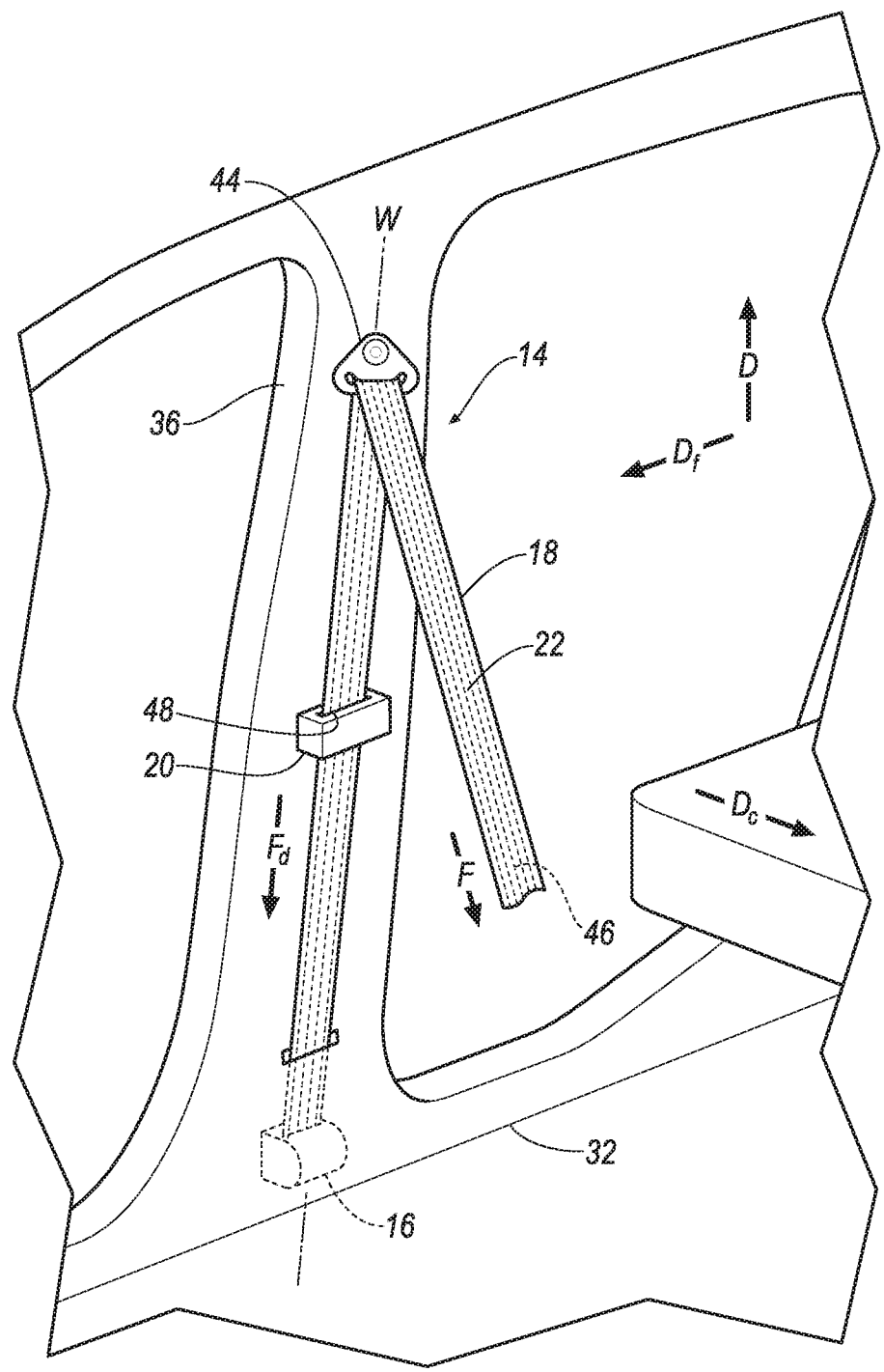
FIG. 2A is a perspective view of one embodiment of the seatbelt assembly including a support having a slot and a webbing extending through the slot.

With reference to FIG. 2A, the webbing 18 is elongated along a webbing axis W. For example, the webbing 18 is elongated along the B-pillar 36, i.e., from the seatbelt retractor 16 to the D-ring 44. In other words, the webbing 18 is elongated in a direction D from the floor 32 to the roof 30 of the vehicle 10.

Figure 2B:
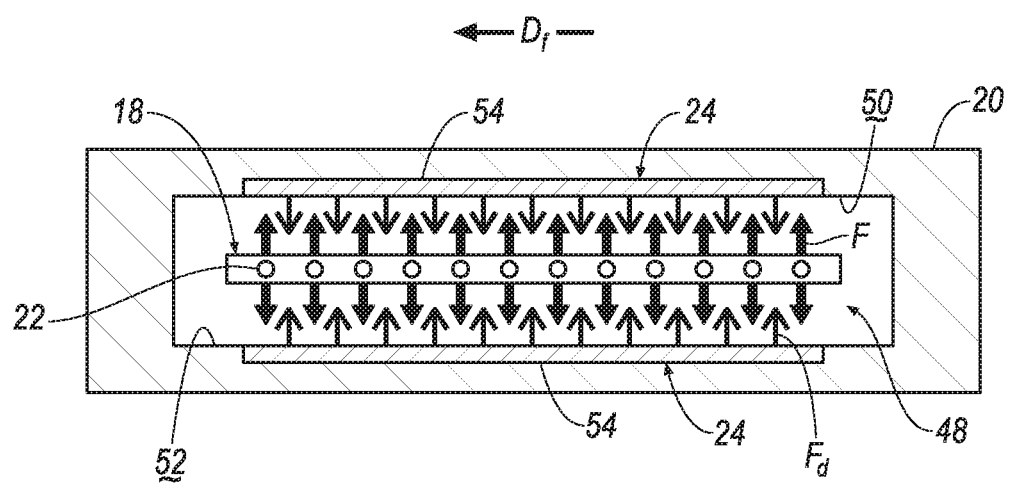
FIG. 2B is a cross sectional view along line 2 of the support in FIG. 2A

With continued reference to the embodiment shown in FIGS. 2A-B, one of the magnet 22 and the conductive material 24 may be fixed to the webbing 18. For example, one of the magnet 22 and the conductive material 24 may be embedded in the webbing 18. In other words, one of the magnet 22 and the conductive material 24 may be woven into the webbing 18, as shown in FIG. 2B. In this situation, one of the magnet 22 and the conductive material 24 may be at least one strand 46 elongated along the webbing axis W. The webbing 18 may include any suitable number of strands, e.g., one or more. The strand 46 may be, for example, a continuous piece elongated along the length of the webbing 18, e.g., from one end to the other end of the webbing 18. In this situation, the strand 46 may extend from the seatbelt retractor 16 through the D-ring 44 to the anchor 38. As another example, the strand 46 may be a plurality of segments aligned along the webbing axis W. In this situation, each segment may be elongated along a portion of the length of the webbing 18, as shown in FIG. 2A. In other words, the plurality of segments may be disposed along the length of the webbing 18, e.g., from one end to the other end of the webbing 18.

As another example, one of the magnet 22 and the conductive material 24 may be embedded in a sleeve (not shown) fixed to the webbing 18. In this situation, the sleeve may extend around, e.g., entirely or partially, the webbing 18 about the webbing axis W. The sleeve may extend along the webbing 18, e.g., along the webbing axis W, such that the sleeve moves through the slot of the support 20 during the vehicle impact. For example, the sleeve may extend through the slot of the support 20 by default. Alternatively, the sleeve may be spaced from the slot of the support 20 be default. In other words, the sleeve may be disposed between the support 20 and the seatbelt retractor 16. The sleeve may be fixed to the webbing 18 in any suitable manner, e.g., stitching, ultrasonic welding, etc.

With reference to FIG. 2A, the support 20 may be fixed to the B-pillar 36. For example, the support 20 may be fixed to the B-pillar 36 between the seatbelt retractor 16 and the D-ring 44. The support 20 may include a slot 48 extending through the support 20 along the webbing axis W.

With reference to FIG. 2B, the slot 48 includes two surfaces 50, 52 spaced from each other in the cross-vehicle direction Dc and extending along the webbing axis W. At least one of the surfaces 50, 52 supports the other of the magnet 22 and the conductive material 24. For example, the other of the magnet 22 and the conductive material 24 may be fixed to the support 20 in the slot 48, i.e., fixed to at least one of the surfaces 50, 52 of the slot 48.

With continued reference to FIG. 2B, the other of the magnet 22 and the conductive material 24 may be a plate 54. In other words, the other of the magnet 22 and the conductive material 24 may extend generally in a plane (not shown) along the surface of the slot 48, i.e., along the webbing axis W, and along a vehicle fore-and-aft direction Df, e.g., transverse to the webbing axis W. For example, one plate 54 may be fixed to each surface of the slot 48.

The webbing 18 extends through the slot 48, i.e., between the two surfaces 50, 52, as shown in FIGS. 2A-2B, and is moveable relative to the slot 48, i.e., the two surfaces 50, 52 of the slot 48. In other words, the webbing 18 is moveable relative to the other of the magnet 22 and the conductive material 24. For example, when the webbing 18 extends from and retracts into the seatbelt retractor 16, the webbing 18 moves through the slot 48. In this situation, the webbing 18 moves one of the magnet 22 and the conductive material 24 through the slot 48 relative to the other of the magnet 22 and the conductive material 24.

Figure 3A:
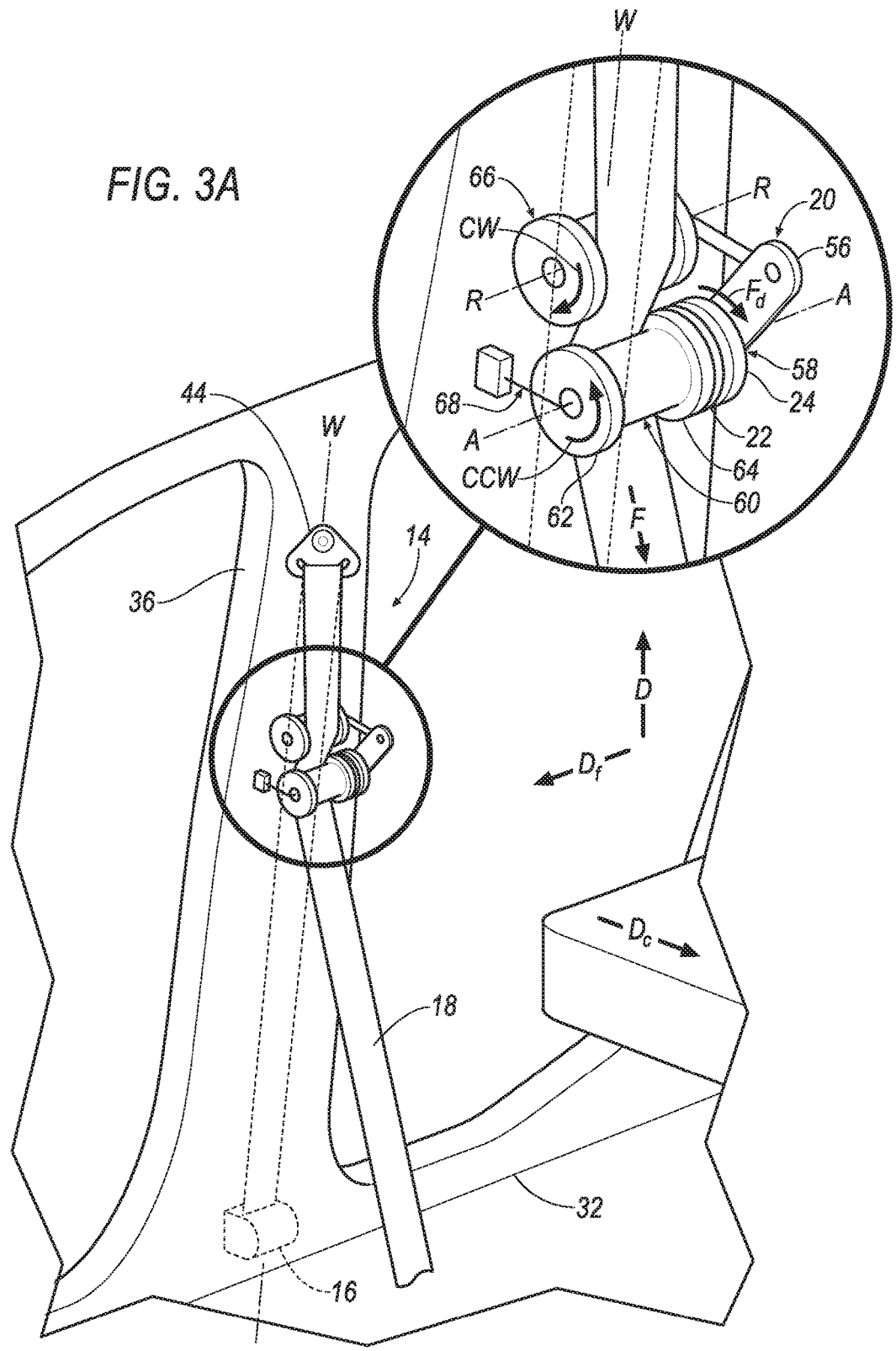
FIG. 3A is a perspective view of another embodiment of the seatbelt assembly including a tension pulley rotationally supported by the support and engageable with the webbing.

With reference to FIG. 3A, the support 20 may include a first end 56 supported by the B-pillar 36, e.g., directly or connected through intermediate components, and spaced from the webbing 18. The support 20 is pivotable about the first end 56 in the cross-vehicle direction Dc. In other words, the support 20 is pivotable towards and away from the B-pillar 36, i.e., the webbing 18.

With continued reference to FIG. 3A, the support 20 includes a second end 58 spaced from the first end 56, e.g., generally along the webbing axis W. For example, the second end may be disposed between the first end 56 and the floor 32 of the vehicle 10. One of the magnet 22 and the conductive material 24 may be fixed to the second end of the support 20.

With continued reference to FIG. 3A, the support 20 may include a tension pulley 60 rotationally supported by the second end. In this situation, the tension pulley 60 may be rotatable relative to the second end 58 of the support 20. The tension pulley 60 may define an axis of rotation A about which the tension pulley 60 rotates. The axis of rotation A of the tension pulley 60 may extend along the vehicle fore-and-aft direction Df.

With continued reference to FIG. 3A, the tension pulley 60 may include a first wall 62 and a second wall 64 disposed between the first wall 62 and the second end 58 of the support 20. The other of the magnet 22 and the conductive material 24 may be fixed to the second wall 64 of the tension pulley 60. In this situation, the other of the magnet 22 and the conductive material 24 may be rotatable relative to the second end 58 of the support 20, i.e., one of the magnet 22 and the conductive material 24.

Figure 3B:
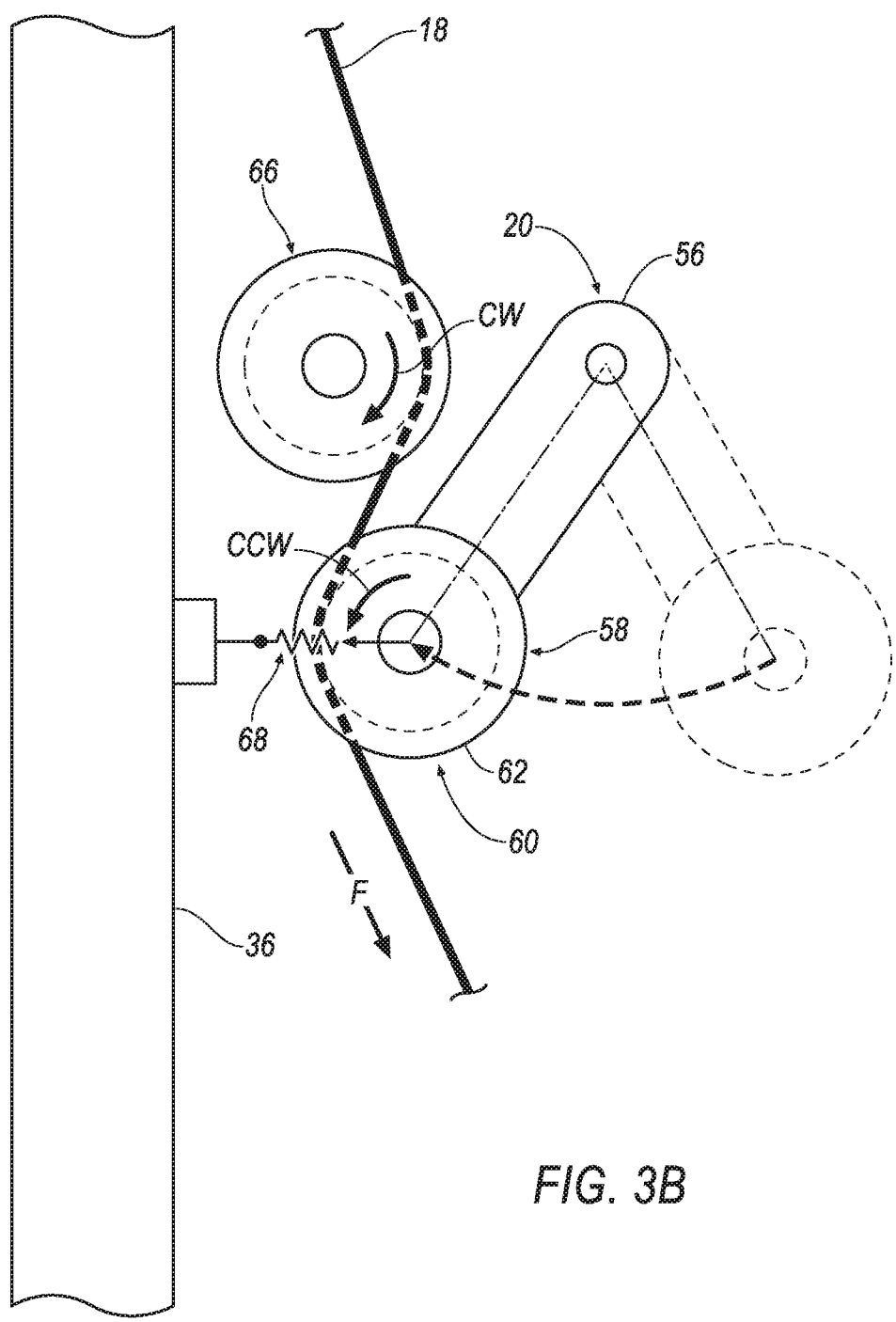
FIG. 3B is a side view of the embodiment of the seatbelt assembly in FIG. 3A.

With reference to FIGS. 3A and 3B, the support 20 may include an anchor pulley 66 spaced from the tension pulley 60. For example, the anchor pulley 66 may be disposed between the tension pulley 60 and the D-ring 44. The anchor pulley 66 may be connected to the vehicle body 26, e.g., the B-pillar 36, in any suitable manner, e.g., with fasteners.

The anchor pulley 66 may define an axis of rotation R about which the anchor pulley 66 rotates. The axis of rotation R of the anchor pulley 66 may extend along the vehicle fore-and-aft direction Df, i.e., parallel to the axis of rotation A of the tension pulley 60, and be spaced from the axis of rotation A of the tension pulley 60 along the webbing axis W.

The anchor pulley 66 is engaged with the webbing 18. For example, the webbing 18 rotates the anchor pulley 66 when the webbing 18 is extracted from and retracted into the seatbelt retractor 16. In other words, the webbing 18 contacts the anchor pulley 66 and exerts a force (not shown) on the anchor pulley 66 such that the anchor pulley 66 rotates when the webbing 18 moves. For example, when the webbing 18 is extracted from the seatbelt retractor 16, the webbing 18 rotates the anchor pulley in a clockwise direction CW, as shown in FIGS. 3A and 3B. The webbing 18 is disposed between the anchor pulley 66 and the tension pulley 60.

With reference to FIG. 3A, the tension pulley 60 is moveable by the support 20 relative to the anchor pulley 66. For example, when the support 20 pivots towards the B-pillar 36, the tension pulley 60 moves generally towards the B-pillar 36, i.e., in a cross-vehicle direction Dc. In this situation, the tension pulley 60 is closer to the anchor pulley 66 as compared to when the support 20 pivots away from the B-pillar 36.

The tension pulley 60 is engageable with the webbing 18 in an engaged position. When the support 20 pivots towards the B-pillar 36, the tension pulley 60 may contact the webbing 18 and push, i.e., direct, the webbing 18 towards the B-pillar 36. In the engaged position, the webbing 18 extends partially around the tension pulley 60 and partially around the anchor pulley 66, as shown in FIG. 3B. In other words, the webbing 18 contacts the tension pulley 60 and the anchor pulley 66. In this situation, the tension pulley 60 may exert a force (not shown) on a webbing 18 such that the webbing 18 is placed in tension, i.e., the webbing 18 may lack slack between the tension pulley 60 and the anchor pulley 66. When the webbing 18 moves, the webbing 18 may exert a force (not shown) on the tension pulley 60 such that the tension pulley 60 is rotated by the webbing 18. For example, when the webbing 18 is extracted from the seatbelt retractor 16, the webbing 18 rotates the tension pulley 60 in a counterclockwise direction CCW, as shown in FIGS. 3A and 3B. In this situation, the tension pulley 60 rotates relative to the second end 58 of the support 20. In other words, the webbing 18 exerts the force on the tension pulley 60 to rotate one of the magnet 22 and the conductive material 24 relative to the other of the magnet 22 and the conductive material 24.

With reference to FIG. 3B, the tension pulley 60 may be in the engaged position by default, i.e., in the absence of a sudden deceleration. For example, the support 20 may include a spring 68 extending from the B-pillar 36 to the first wall 62 of the tension pulley 60. The spring 68 may be fixed to each of the B-pillar 36 and the first wall 62 of the tension pulley 60. The spring 68 may bias the tension pulley 60 towards the webbing 18, i.e., bias the second end 58 of the support 20 towards the B-pillar 36. In other words, the spring 68 may pull the tension pulley 60 into contact with the webbing 18. In this situation, the spring 68 may be under tension to maintain contact between the tension pulley 60 and the webbing 18, e.g., to keep the webbing 18 in tension.

Alternatively, the tension pulley 60 may be in a disengaged position, shown in dashed lines in FIG. 3B, by default, i.e., in the absence of a sudden deceleration. In this situation, the tension pulley 60 is spaced from the webbing 18, e.g. in the cross-vehicle direction Dc. The tension pulley 60 may move to the engaged position during a sudden deceleration of the vehicle 10, i.e., deceleration triggers the support 20 to pivot towards the B-pillar 36. In other words, the tension pulley 60 may move from the disengaged position to the engaged position during the vehicle impact.

In this situation, the support 20 may include an activation sensor (not shown) that senses sudden deceleration of the vehicle 10, e.g., the vehicle impact, and triggers activation of the tension pulley 60 to engage the webbing 18, i.e., the support 20 to pivot towards the B-pillar 36. The activation sensor may be in communication with the support 20, either directly or indirectly through the controller. The activation sensor may be on the support 20, i.e., fixed to the support 20, or elsewhere in the vehicle 10. On the support 20, the activation sensor may be, for example, a weighted pendulum, a centrifugal clutch, or any other suitable type. Elsewhere in the vehicle 10, the activation sensor may be, for example, post-contact sensors such as accelerometers, pressure sensors, and contact switches; pre-impact sensors such as radar, lidar, and vision-sensing systems; or any other suitable type. The vision systems may include one or more cameras, CCD image sensors, CMOS image sensors, etc.

The webbing 18 and the tension pulley 60 may each include a nonslip interface 70. The nonslip interface 70 of the webbing 18 is engageable with the nonslip interface 70 of the tension pulley 60. For example, when the tension pulley 60 contacts the webbing 18, the nonslip interface 70 of the tension pulley 60 engages the nonslip interface 70 of the webbing 18. The nonslip interface 70 of the tension pulley 60 and the webbing 18 may be any suitable interface to prevent slippage of the webbing 18 with respect to the tension pulley 60, as set forth further below.

Figure 4A:
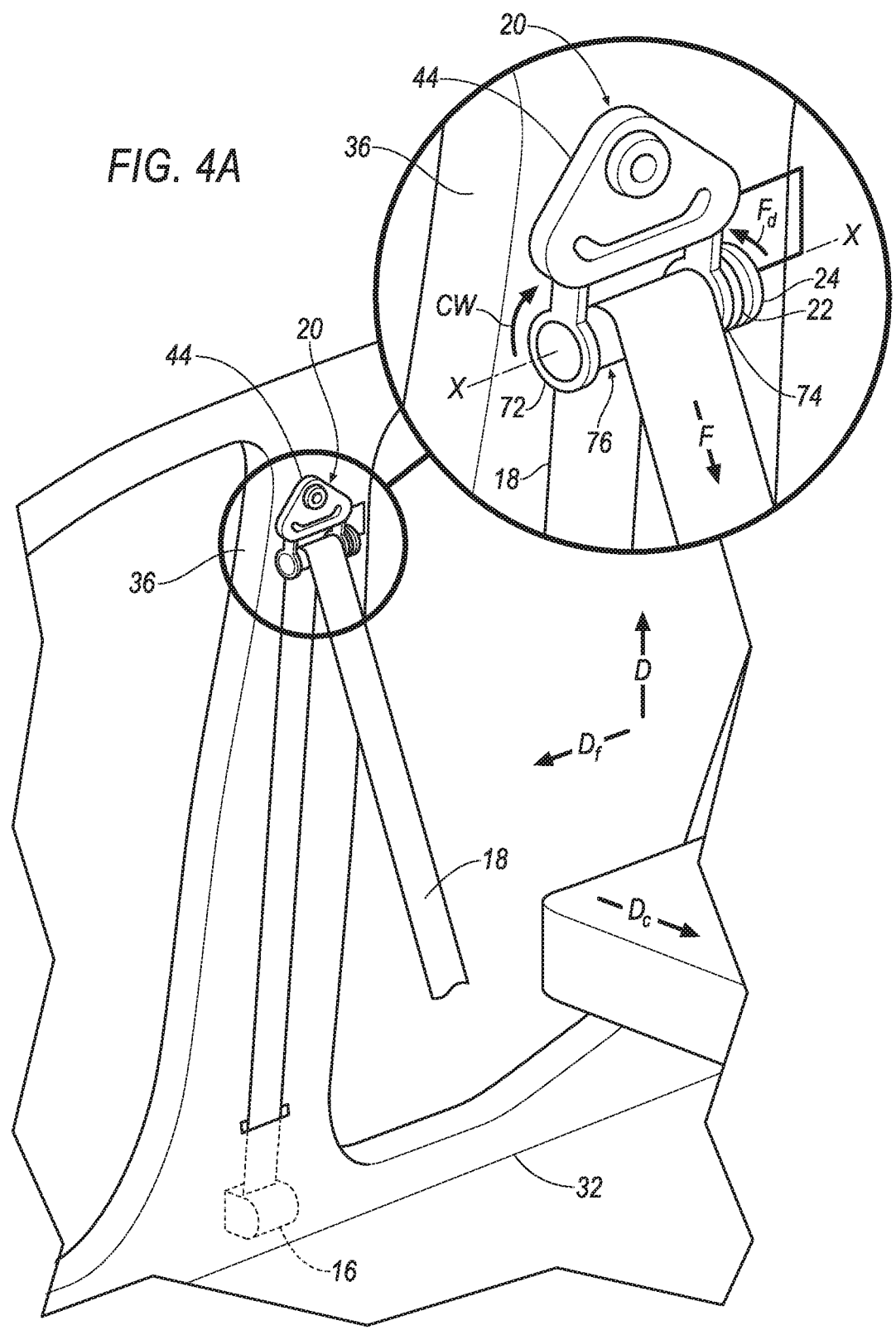
FIG. 4A is a perspective view of another embodiment of the seatbelt assembly including a pulley rotationally supported by the support and engaged with the webbing.

With reference to FIG. 4A, the support 20 may be the D-ring 44. In this situation, the support 20 includes two sides 72, 74 spaced from each other along an axis X transverse to the webbing axis W, e.g., in the vehicle fore-and-aft direction Df. The support 20 includes a pulley 76 extending along the axis X from one side 72 towards the other side 74. The pulley 76 may extend any suitable amount along the axis X. For example, the pulley 76 may extend to the other side 74. As another example, the pulley 76 may extend through the other side 74, i.e., farther along the axis X than the sides 72, 74 of the support 20. As yet another example, the pulley 76 may extend to a position between the one side 72 and the other side 74, i.e., along the axis X less than the sides 72, 74 of the support 20.

The two sides 72, 74 may be designed, e.g., sized, shaped, and positioned, to receive the pulley 76. For example, each side may be an annulus extending circumferentially about the axis X. The other of the magnet 22 and the conductive material 24 is fixed to one of the sides 72, 74 of the support 20, e.g., directly or through intermediate components. For example, one side 72 of the support 20 may be disposed between the other side 74 of the support 20 and the other of the magnet 22 and the conductive material 24, as shown in FIG. 4A. In this situation, the other of the magnet 22 and the conductive material 24 may be fixed to the one side 72 through intermediate components, e.g., a bar. As another example, the other of the magnet 22 and the conductive material 24 may be disposed between the two sides 72, 74 of the support 20 and fixed to one of the sides 72, 74 through intermediate components, e.g., a bar. As yet another example, the other of the magnet 22 and the conductive material 24 may be fixed to one of the sides 72, 74 in the annulus.

With reference to FIG. 4A, the pulley 76 is rotationally supported by both sides 72, 74 of the support 20. In other words, the pulley 76 may rotate relative to each side of the support 20. The pulley 76 is engaged with the webbing 18. For example, the pulley 76 is rotatable by the webbing 18 when the webbing 18 is extracted into or retracted from the seatbelt retractor 16. When the webbing 18 moves, the webbing 18 exerts a force (not shown) on the pulley 76 such that the webbing 18 rotates the pulley 76 about the axis X relative to the sides 72, 74 of the support 20. For example, when the webbing 18 is extracted from the seatbelt retractor 16, the webbing 18 rotates the pulley 76 in the clockwise direction CW.

With continued reference to FIG. 4A, the other of the magnet 22 and the conductive material 24 is fixed to the pulley 76. Specifically, one of the magnet 22 and the conductive material 24 is fixed to the pulley 76 adjacent one side 72 of the support 20, e.g., the side of the support 20 fixed to the other of the magnet 22 and the conductive material 24. When the webbing 18 rotates the pulley 76, the webbing 18 exerts the force on the pulley 76 to rotate one of the magnet 22 and the conductive material 24 relative to the other of the magnet 22 and the conductive material 24.

Figure 4B:
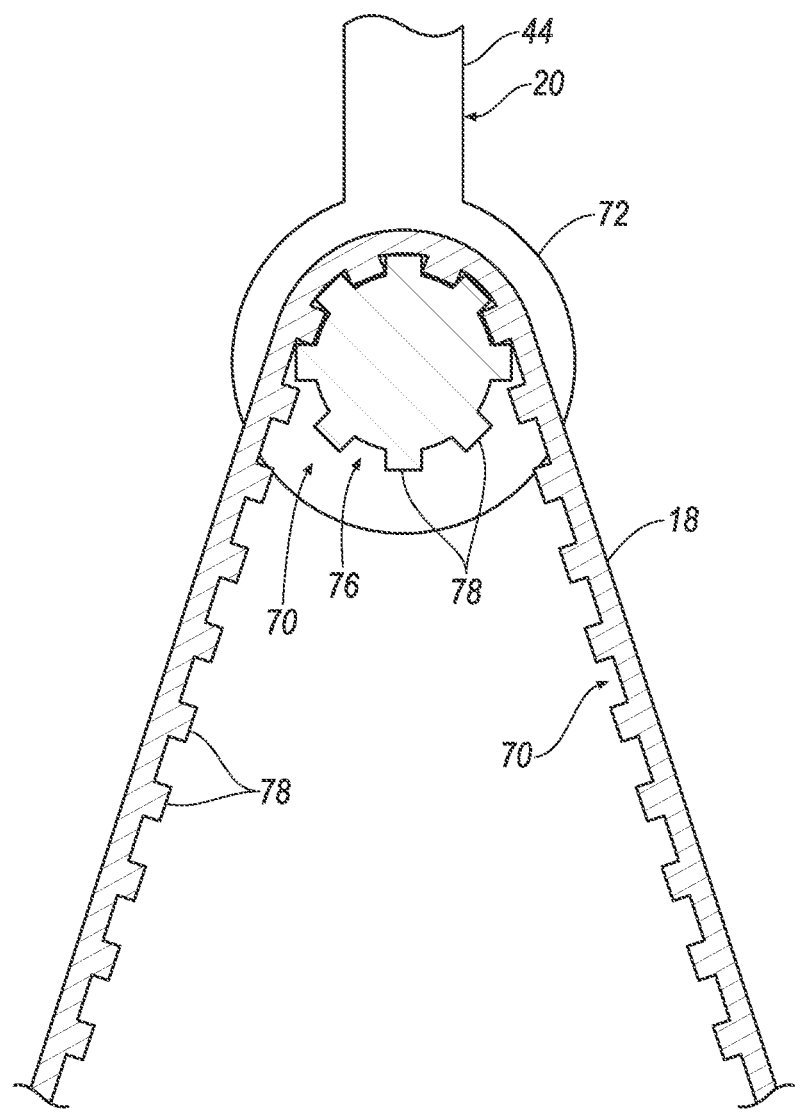
FIG. 4B is a side view of the embodiment of the seatbelt assembly in FIG. 4A.

The webbing 18 and the pulley 76 each include the nonslip interface 70. The nonslip interface 70 of the webbing 18 is engaged with the nonslip interface 70 of the pulley 76. The nonslip interface 70 may, for example, be cogs 78 extending in the vehicle fore-and-aft direction Df along both the webbing 18 and the pulley 76. In this situation, the cogs 78 of the webbing 18, e.g., spaced from each other along the length of the webbing 18, mesh with the cogs 78 of the pulley 76, e.g., spaced from each other about the axis of rotation A of the pulley 76, as shown in FIG. 4B. As another example, the nonslip interfaces 70 may be a coating on the pulley 76 and the webbing 18 to prevent slippage of the webbing 18 relative to the pulley 76. The coating may be attached to the pulley 76 and the webbing 18. Alternatively, the coating may be sprayed onto the pulley 76 and the webbing 18. The coating may be any suitable material to prevent slippage of the webbing 18 relative to the pulley 76. As yet another example, the nonslip interface 70 may be grooves extending into the pulley 76 and the webbing 18. In this situation, the grooves of the webbing 18, e.g., extending along the webbing axis W, mesh with the grooves of the pulley 76, e.g., extending about the axis of rotation A of the pulley 76.

As one of the magnet 22 and the conductive material 24 rotates relative to the other of the magnet 22 and the conductive material 24, the seatbelt assembly 14 may exert the drag force Fd to increase the load by the webbing 18 and absorb energy from the occupant during the vehicle impact. The drag force Fd may counteract the force F of the occupant exerted on the webbing 18, as set forth above, and may be proportional to the velocity of one of the magnet 22 and the conductive material 24, i.e., the drag force Fd may increase when the relative velocity between the magnet 22 and the conductive material 24 increases. In other words, the drag force Fd may be proportional to the velocity of the payout of the webbing 18.

The drag force Fd may be formed by an eddy current. The relative motion of the conductive material 24 with respect to the magnet 22 may induce an electric current in the conductive material 24. Specifically, the relative motion of the conductive material 24 with respect to the magnetic field of the magnet 22 may induce the electric current in the conductive material 24. The electric current may flow in an opposite direction of the velocity of one of the conductive material 24 and the magnet 22. In other words, the electric current may flow in an opposite direction of the movement, e.g., extraction, of the webbing 18. The electric current may cause a counter magnetic field that exerts the drag force Fd opposing the relative motion of the conductive material 24 and the magnet 22. For example, when the relative velocity of one of the magnet 22 and the conductive material 24 is in one of the clockwise CW direction and the counterclockwise direction CCW, the drag force Fd acts in the other of the clockwise direction CW and the counterclockwise CCW direction, as shown in FIGS. 3A-4B. As another example, when the relative velocity of one of the magnet 22 and the conductive material 24 is towards the roof 30, i.e., in the direction D, the drag force Fd acts towards the floor 32, as shown in FIG. 2A.

The drag force Fd is dependent on the size of the occupant during the vehicle impact. For example, a larger occupant may exert a higher load on the webbing 18 than a smaller occupant in the same vehicle impact. In other words, a larger occupant may have more momentum during the vehicle impact than the smaller occupant. When the webbing 18 is subjected to the higher load of the larger occupant, the webbing 18 may payout at a faster rate than when the webbing 18 is subjected to a load of the smaller occupant. When the webbing 18 payout is at the faster rate, the relative velocity between the magnet 22 and the conductive material 24 is increased as compared to when the webbing payout is at a slower rate, e.g., when the webbing 18 is subjected to the load from the smaller occupant. Since the drag force Fd is proportional to the relative velocity between the magnet 22 and the conductive material 24, as set forth above, the seatbelt assembly 14 may exert more drag force Fd on the larger occupant to counteract the increased momentum of the larger occupant as compared to when the seatbelt assembly 14 exerts the drag force Fd on the smaller occupant.

During the vehicle impact, an occupant of the seat 12 has forward momentum relative to the seat 12 and exerts the force F on the webbing 18. The force F on the webbing 18 tends to pull the webbing 18 from the seatbelt retractor 16. When the seatbelt retractor 16 is in the locked position, the torsion bar may prevent payout of the webbing 18 until the force F on the webbing 18 exceeds the threshold force to cause the torsion bar to deform.

As the webbing 18 pays out from the seatbelt retractor 16, the webbing 18 moves one of the magnet 22 and the conductive material 24, e.g., directly or through intermediate components, relative to the other of the magnet 22 and the conductive material 24 because the other of the magnet 22 and conductive material is fixed to the support 20. For example, in the embodiments shown in FIGS. 3A-4B, the webbing 18 rotates one of the tension pulley 60 and the pulley 76, respectively, when the webbing 18 is extracted from the seatbelt retractor 16. In this situation, one of the tension pulley 60 and the pulley 76 is rotated relative to the support 20, which causes one of the magnet 22 and the conductive material 24 to rotate relative to the other of the magnet 22 and the conductive material 24. In the embodiment shown in FIGS. 2A-2B, the webbing 18 moves one of the magnet 22 and the conductive material 24 through the slot 48 of the support 20 because one of the magnet 22 and the conductive material 24 is fixed to, e.g., embedded in, the webbing 18. In this situation, the one of the magnet 22 and the conductive material 24 moves relative to the other of the magnet 22 and the conductive material 24, which is fixed to the slot 48. When the magnet 22 and the conductive material 24 move relative to each other, the force F exerted by the occupant is counteracted by the drag force Fd such that the seatbelt assembly 14 limits the load exerted by the webbing 18 on the occupant. The limited load may assist in reducing chest compression of the occupant and absorbing energy from the occupant during the vehicle impact.

The disclosure has been described in an illustrative manner, and it is to be understood that the terminology which has been used is intended to be in the nature of words of description rather than of limitation. Many modifications and variations of the present disclosure are possible in light of the above teachings, and the disclosure may be practiced otherwise than as specifically described.

What is claimed is:

1. A seatbelt assembly comprising:
a seatbelt retractor;
a D-ring spaced from the seatbelt retractor;

a support disposed between the D-ring and the seatbelt retractor;

a webbing retractably engaged with the seatbelt retractor and moveable relative to the support; and a magnet and a conductive material adjacent the magnet, one of the magnet and the conductive material being fixed to the support and the other of the magnet and the conductive material being moveable by the webbing relative to the support.

2. The seatbelt assembly of claim 1, wherein the support includes a slot and the webbing extends through the slot.

3. The seatbelt assembly of claim 2, wherein one of the magnet and the conductive material is fixed to the webbing and the other of the magnet and the conductive material is fixed to the support in the slot.

4. The seatbelt assembly of claim 3, wherein the one of the magnet and the conductive material is embedded in the webbing.

5. The seatbelt assembly of claim 3, wherein the webbing is elongated along a webbing axis, and the one of the magnet and the conductive material is at least one strand elongated along the webbing axis.

6. The seatbelt assembly of claim 3, wherein the other of the magnet and the conductive material is a plate.

7. The seatbelt assembly of claim 1, wherein the support includes a first end, the support being pivotable about the first end.

8. The seatbelt assembly of claim 7, further comprising a tension pulley, and wherein the support includes a second end spaced from the first end, the tension pulley being rotationally supported by the second end of the support.

9. The seatbelt assembly of claim 8, wherein the one of the magnet and the conductive material is fixed to the second end of the support and the other of the magnet and the conductive material is fixed to the tension pulley.

10. The seatbelt assembly of claim 8, wherein the tension pulley is engageable with the webbing, the tension pulley being rotatable by the webbing.

11. The seatbelt assembly of claim 10, further comprising a spring connected to the tension pulley, the spring biasing the tension pulley towards the webbing.

12. The seatbelt assembly of claim 10, wherein the webbing and the tension pulley each include a nonslip interface, the nonslip interface of the webbing is engageable with the nonslip interface of the tension pulley.

13. The seatbelt assembly of claim 8, further comprising an anchor pulley spaced from the tension pulley and engaged with the webbing, the tension pulley being moveable by the support relative to the anchor pulley.

14. The seatbelt assembly of claim 1, wherein the magnet is a permanent magnet.

15. The seatbelt assembly of claim 1, wherein the magnet is an electro-magnet.

16. A seatbelt assembly comprising:

a seatbelt retractor;

a support spaced from the seatbelt retractor;

a webbing retractably engaged with the seatbelt retractor and moveable relative to the support; and a magnet and a conductive material adjacent the magnet, one of the magnet and the conductive material being fixed to the support and the other of the magnet and the conductive material being moveable by the webbing relative to the support;

wherein the support includes a slot and the webbing extends through the slot;

wherein one of the magnet and the conductive material is fixed to the webbing and the other of the magnet and the conductive material is fixed to the support in the slot.

17. The seatbelt assembly of claim 16, wherein the one of the magnet and the conductive material is embedded in the webbing.

18. The seatbelt assembly of claim 16, wherein the webbing is elongated along a webbing axis, and the one of the magnet and the conductive material is at least one strand elongated along the webbing axis.

19. The seatbelt assembly of claim 16, wherein the other of the magnet and the conductive material is a plate.

* * * * *